United States Patent
Murray (10) Patent No.: US 7,279,096 B2
(45) Date of Patent: *Oct. 9, 2007

(54) POLYMER BASED PERMEABLE MEMBRANE FOR REMOVAL OF IONS

(75) Inventor: George M. Murray, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/924,666

(22) Filed: Aug. 24, 2004

(65) Prior Publication Data

US 2005/0019302 A1     Jan. 27, 2005

Related U.S. Application Data (63) Continuation of application No. 10/272,733, filed on Oct. 16, 2002, now Pat. No. 6,780,323.

(60) Provisional application No. 60/329,651, filed on Oct. 16, 2001.

(51) Int. Cl.
| | | |
|---|---|---|
| B01D 39/00 | (2006.01) | |
| B01D 39/14 | (2006.01) | |
| C02E 1/44 | (2006.01) | |
| B32B 5/02 | (2006.01) | |

(52) U.S. Cl. .................. 210/500.34; 210/500.27; 210/502.1; 210/638; 521/99; 422/91

(58) Field of Classification Search ........... 210/500.27, 210/502.1, 638, 480, 500.34, 500.35, 651; 264/41; 436/518, 164, 172; 427/245; 526/317; 521/99; 422/91, 68.1; 435/325

See application file for complete search history.

(56) References Cited

U.S. PATENT DOCUMENTS

| | | | |
|---|---|---|---|
| 5,587,273 A | 12/1996 | Yan et al. | |
| 5,786,428 A | 7/1998 | Arnold et al. | |
| 5,821,311 A | 10/1998 | Mosbach et al. | |
| 5,872,198 A | 2/1999 | Mosbach et al. | |
| 5,959,050 A | 9/1999 | Mosbach et al. | |
| 5,980,987 A | 11/1999 | Tarbet et al. | |
| 5,994,110 A | 11/1999 | Mosbach et al. | |
| 6,127,154 A | 10/2000 | Mosbach et al. | |
| 6,217,901 B1 | 4/2001 | Perrott et al. | |
| 6,274,686 B1 | 8/2001 | Mosbach et al. | |
| 6,310,110 B1 * | 10/2001 | Markowitz et al. | ........... 521/99 |
| 6,316,235 B1 | 11/2001 | Mosbach et al. | |
| 6,372,571 B2 | 4/2002 | Kim | |
| 6,372,872 B1 | 4/2002 | Port et al. | |

(Continued)

FOREIGN PATENT DOCUMENTS

| | | |
|---|---|---|
| WO | WO 03/033575 | 4/2003 |

(Continued)

*Primary Examiner*—Ana Fortuna
(74) *Attorney, Agent, or Firm*—Francis A. Cooch (57) ABSTRACT

Molecularly imprinted polymer membranes for selectively collecting phosphate, nitrate and ferric ions are disclosed, prepared by copolymerizing a matrix monomer, cross-linking agent, ion imprinting complex, permeability agent and polymerization initiator, after which the ions of the ion imprinting complex are permeability agent are removed. The permeability agent creates channels in the membrane permitting the ion binding sites in the membrane to communicate with the exterior surface of the membrane.

9 Claims, 7 Drawing Sheets

U.S. PATENT DOCUMENTS

| | | |
|---|---|---|
| 6,379,551 B1 | 4/2002 | Lee et al. |
| 6,582,971 B1 | 6/2003 | Singh et al. |
| 6,627,571 B1 * | 9/2003 | Lugmair et al. ............... 502/2 |
| 6,749,811 B2 * | 6/2004 | Murray ........................ 422/91 |
| 6,780,323 B2 * | 8/2004 | Murray ....................... 210/638 |
| 6,833,274 B2 * | 12/2004 | Lawrence et al. .......... 436/128 |
| 6,960,645 B2 * | 11/2005 | Ramakrishnan et al. .... 528/480 |
| 7,001,963 B2 * | 2/2006 | Kulkarni et al. ............ 526/258 |
| 7,129,085 B2 * | 10/2006 | Feder et al. ................. 435/325 |

FOREIGN PATENT DOCUMENTS

| | | |
|---|---|---|
| WO | WO 2004/007597 | 1/2004 |

* cited by examiner

BAR = 1 μm

FIG. 7

POLYMER BASED PERMEABLE MEMBRANE FOR REMOVAL OF IONS

This application is a continuation of U.S. patent application Ser. No. 10/272,733, filed on Oct. 16, 2002, issued as U.S. Pat. No. 6,780,323, which claims the benefit of provisional patent application Ser. No. 60/329,651, filed Oct. 16, 2001, the entire disclosures of which are incorporated herein by reference.

CROSS-REFERENCE TO RELATED APPLICATIONS

The present invention is related to the subject matter of U.S. patent application Ser. No. 09/300,867, filed on Apr. 28, 1999, which claims priority from provisional patent application Ser. No. 60/083,365, filed on Apr. 28, 1998, and U.S. patent application Ser. No. 10/229,884, filed on Aug. 27, 2002, which claims priority from provisional patent application Ser. No. 60/315,781, filed on Aug. 28, 2001, the entire disclosures of which are incorporated herein by reference.

BACKGROUND OF THE INVENTION

1. Field of the Invention

The present invention relates generally to molecularly imprinted materials, and, more particularly, to a molecularly imprinted polymer material including selective binding sites for cations and anions, for example, ferric, phosphate, or nitrate ions.

2. Description of the Related Art

The concept of molecularly imprinting molecules may be traced to suppositions about the operation of the human immune system made by Stuart Mudd, circa 1930, and Linus Pauling, circa 1940. Mudd proposed the idea of complementary structures, by which a specific antibody attaches to a specific target or antigen because the shape of the antibody provides a cavity for receiving the shape of the antigen. The "lock and key" analogy used in explaining the action of enzymes is similarly explained, where enzymes form a "lock" for a particular chemical "key". Pauling postulated on how an otherwise nonspecific antibody molecule could be reorganized into a specific binding molecule. He reasoned that shape specificity was obtained when the body assembled a new protein complement, i.e., antibody, by using a target antigen as a template in arranging the complementary shape of an antibody. A nonspecific molecule can thus be shaped to the contours of a specific target. When the target is removed, the shape of the target is retained, which provides an antibody with a propensity to rebind the antigen. This process is known as molecular imprinting.

Molecular imprinting is used to create specific recognition sites in substrate materials, for example, polymeric organic materials. Known molecular imprinting techniques involve crosslinking materials in the presence of a functional monomer or mixture of monomers. Reactive or coordination sites on a target molecule or complex interact with a complementary site on a functional monomer during the polymerization process, either covalently or by other interactions such as ionic, hydrophobic or hydrogen bonding. Upon removal of the target molecule from the substrate, a "cavity" or recognition site is formed for receiving a similarly shaped molecule.

Synthetic production of molecularly imprinted polymers with selective binding sites for a specific target cation is achieved by providing polymers with cavities lined with complexing groups or "ligands" arranged to match the charge, coordination number, coordination geometry, and size of the target cation. Molecularly imprinted polymers with selective binding sites for anions are made in a similar manner to cations, but typically employ a trapped metal ion that has a high affinity for the target anion. Cavity-containing polymers may be produced using a specific ion as a template around which monomeric complexing ligands will be self-assembled and polymerized. Complexing ligands contain functional groups known to form stable complexes with the specific target ion and less stable complexes with other ions.

A method of molecular imprinting referred to as solution polymerization results in the formation of imprinted sites that are completely encased within the polymer. To access those sites, the polymer must be ground to produce particles that have exposed sites. The grinding process, however, produces irregularly shaped particles and also damages the sites by adversely affecting selectivity and activity. As an alternative method to increase accessibility to the imprinted sites is by using porogens, which are typically inert solvents, which when removed, create pores to allow access to the created binding sites. Removal of the porogen solvent adversely affects the structural integrity of the polymer, leading to deformation of the sites and loss in specificity and activity.

Molecular imprinting is useful in a variety of applications. For example, the ability to remove a specific component from its environment applies to both environmental and medical fields.

According to the Environmental Protection Agency, approximately 40 percent of the waterways in the United States still do not meet water quality goals and about half of the 2000 major watersheds have water quality problems. Phosphorus and nitrogen are major pollutants that enter our waterways as runoff from sewage plants and farmland, posing a clear threat to drinking water and aquatic life. As the nitrates increase in the environment, they act as plant nutrients, and cause an increase in plant growth. As plant material dies and decomposes, dissolved oxygen levels decrease. An increase in nitrates may be followed by an increase in phosphates. As phosphates increase and the growth of aquatic plants is encouraged, algal blooms can occur. With an increase in algal growth and decomposition, the dissolved oxygen levels further decrease, causing the death of fish and disruption to the ecosystem. Likewise, excess nitrate levels in drinking water are dangerous and can result in health risks, such as "blue baby" syndrome, which is a diminished capacity of the blood in transporting and transferring oxygen.

In the medical field, there are no known methods for removing excess iron from the blood of patients with extremely high iron levels, such as those suffering from Iron Overload Disease, also known as Hemochromatosis, and iron overdose, without attendant problems. Presently known treatments include replacement of the fatally iron rich blood by transfusion or chelation therapy, by which important electrolytes are lost and additional problems are introduced.

There remains a need for an effective and easy to use method and apparatus for removing iron, nitrate, or phosphate ions from an environment.

SUMMARY OF THE INVENTION

Briefly described, a method for making a molecularly imprinted polymer membrane according to an aspect of the invention is provided. The membrane includes a selective binding site for phosphate anions. The method for making the membrane includes the steps of copolymerizing a solution comprising a matrix monomer, a cross-linking agent, a lanthanide-phosphate anion imprinting complex, a permeability agent, and an initiator for the polymerization mixture, so that a polymer membrane is formed, and, removing the phosphate anions and the permeability agent from the polymer membrane so that cavities and channels for receiving phosphate anions are formed in the membrane. The cavities are in communication with the exterior surface of the membrane by means of the channels. The imprint monomer is preferably styrene, the cross-linking agent is preferably divinylbenzene, the initiator is preferably azobisisobutyronitrile, and the permeability agent is preferably polyester. The lanthanide-phosphate anion imprinting complex is preferably Ln(lanthanide)(III)tris(vinylbenzoylacetonate)(acryamidophenanthroline)biphosphate. Polyester and phosphate anions are removed by contacting the polymer membrane with an acidic solution.

A method for making a molecularly imprinted polymer membrane including a selective binding site for nitrate anions according to an aspect of the invention is also provided. The method includes the steps of copolymerizing a solution comprising a matrix monomer, a cross-linking agent, a nickel-nitrate anion imprinting complex, a permeability agent, and an initiator for the polymerization mixture, so that a polymer membrane is formed, and removing nitrate anions and the permeability agent from said polymer membrane so that cavities and channels for receiving nitrate anions are formed in the membrane. The cavities are in communication with the exterior surface of the membrane by means of the channels. The imprint monomer is preferably styrene, the cross-linking agent is preferably divinylbenzene, the initiator is preferably azobisisobutyronitrile, and the permeability agent is preferably polyester. The nickel-nitrate anion imprinting complex is preferably nickel (or Ni)(II)bis-(acrylamidophenanthroline)nitrate. The polyester and nitrate anions are removed by contacting the polymer membrane with an acidic solution.

A method for making a molecularly imprinted polymer membrane including a selective binding site for ferric cations according to an aspect of the invention is also provided. The method includes the steps of copolymerizing a solution comprising an matrix monomer, a cross-linking agent, an iron vinylbenzoate cation imprinting complex, a permeability agent, and an initiator for the polymerization mixture, so that a polymer membrane is formed, and removing ferric cations and the permeability agent from said polymer membrane so that cavities and channels for receiving ferric cations are formed in the membrane. The cavities are in communication with the exterior surface of the membrane by means of the channels. The matrix monomer is preferably styrene, the cross-linking agent is preferably divinylbenzene, the initiator is preferably azobisisobutyronitrile, and the permeability agent is preferably polyester. The iron vinylbenzoate cation imprinting complex is Fe(III)(vinylbenzoate)$^3$. The polyester and ferric cations are removed by contacting the polymer membrane with an acidic solution.

The present invention also includes molecularly imprinted polymer membranes prepared by the inventive methods. According to another aspect of the invention, a molecularly imprinted polymer membrane is provided, and includes a selective binding site for phosphate anions characterized by channels disposed through said membrane to increase permeability and direct said phosphate anions to said binding sites. The membrane includes a cross-linked polymer matrix having channels disposed therethrough and with phosphate binding sites on the interior surface thereof in communication with the exterior surface of the membrane by means of the membrane channels. The membrane also has a thickness of approximately 100 microns.

According to another aspect of the invention, a molecularly imprinted polymer membrane is provided, and includes a selective binding site for nitrate anions characterized by channels disposed through said membrane to increase permeability and direct said nitrate anions to said binding sites. The membrane includes a cross-linked polymer matrix having channels disposed therethrough and with nitrate anion binding sites on the interior surface thereof in communication with the exterior surface of the membrane by means of the membrane channels. The membrane also has a thickness of approximately 100 microns.

According to another aspect of the invention, a molecularly imprinted polymer membrane is provided, and includes a selective binding site for ferric cations characterized by channels disposed through said membrane to increase permeability and direct said ferric cations to said binding sites. The membrane includes a cross-linked polymer matrix having channels disposed therethrough and with ferric cation binding sites on the interior surface thereof in communication with the exterior surface of the membrane by means of the membrane channels. The membrane also has a thickness of approximately 100 microns.

According to another aspect of the invention, the target ions are removed from an aqueous solution, collected, and reused in another application.

DETAILED DESCRIPTION

The present invention uses the techniques of molecularly imprinting polymers for providing a selective binding site in a polymer membrane for receiving cations and anions. The present invention also uses a permeability agent for increasing permeability of the membrane, by forming channels through the membrane. The channels increase permeability of the membrane by directing the cations or anions to the selective binding sites. The transport of ions through the molecularly imprinted polymer membranes of the invention is for separating, removing, or recovering the captured ions, which is driven by environmental and medical concerns.

It will be appreciated by those skilled in the art that a goal in making a molecularly imprinted polymer is to use an ion imprinting complex that will survive the polymerization process and leave behind a selective binding site when the ion species is removed from the ion imprinting complex. In forming a complex, ligands must be chosen that exhibit sufficiently high affinities to resist dissociation. In addition, the polymerization process must provide sufficient rigidity to effect structural "memory" but be sufficiently flexible to allow removal of the ion.

As used herein, the terms "molecularly imprinted polymer" and "MIP" refer to a polymer structure that includes an ion imprinting complex. The polymer structure has organized interactive moieties complementary to the spacing of binding sites on the ion imprinting complex. Interactive moieties include functional groups or ligands. The geometrical organization of the interactive moieties imparts selective binding characteristics for the ion imprinting complexes within the molecularly imprinted polymer. The selective binding interactions refer to preferential and reversible binding exhibited by the MIP for an ion (anion or cation) imprinting complex, as described herein.

As used herein, the term "complex" refers to a coordination compound formed by the union of a lanthanide or other metal ion with a non-metallic ion or molecule referred to herein as a ligand. The lanthanide-phosphate anion imprinting complexes of the present invention comprise at least one central lanthanide ion and at least one bidentate phosphate ligand, the nickel-nitrate anion imprinting complexes comprise at least one central nickel atom and at least one bidentate nitrate ligand, and the iron vinylbenzoate cation imprinting complexes comprise at least one central iron atom and at least one bidentate vinylbenzoate ligand.

Ligands are moieties which enter into a coordination bond with a metal atom, for example, a transition metal atom, such as nickel or iron, or a lanthanide rare earth metal atom, for example, lanthanum. As used herein, the term "bidentate" refers generally to a ligand offering two groups of atoms or ions for attachment to the central ion in a chelate composition. This may involve charge center development, but not to the extent that the bond is ionic in nature. Thus, there is considerable covalent character to a ligand/metal bond. Bidentate ligands have two sites on the ligand that form coordination bonds to a metal center which, by virtue of the geometric arrangement of the atoms comprising the ligand, can occupy two coordination sites on a single metal atom simultaneously.

It is important to distinguish ligands that have two monodentate coordination sites on the ligand from those which have two coordination sites arranged such that they can participate in a bidentate binding interaction. For example, 2,2' bipyridine is bidentate (the nitrogen atom of each pyridine ring is adjacent to the carbon bonded to the other ring) and therefore the nitrogen atoms are geometrically situated such that they can coordinate to two separate coordination sites on a single transition metal atom simultaneously), but 4,4'bipyridine (the nitrogen atoms of each pyridine ring are opposite to the carbon bonded to the other ring) is not bidentate, because, although each nitrogen atom can coordinate to a separate coordination site on two different transition metals at the same time, they cannot both simultaneously coordinate to two different coordination sites on the same transition metal.

As used herein, the term "lanthanide" refers to the following elements of the periodic table: lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). A preferred lanthanide for use in the present invention is Lanthanum (III).

Figure 2A:
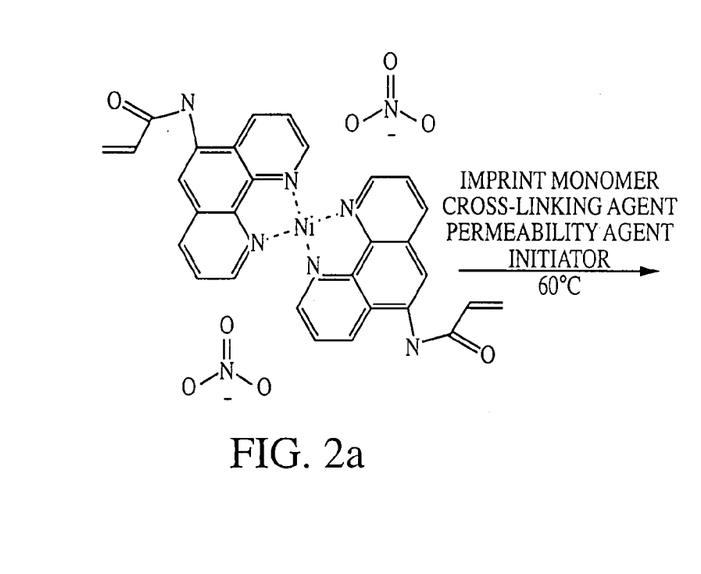
FIGS. 2a-d schematically represent the process of molecularly imprinting a polymer using a nickel-nitrate complex according to an aspect of the invention.
Figure 2B:
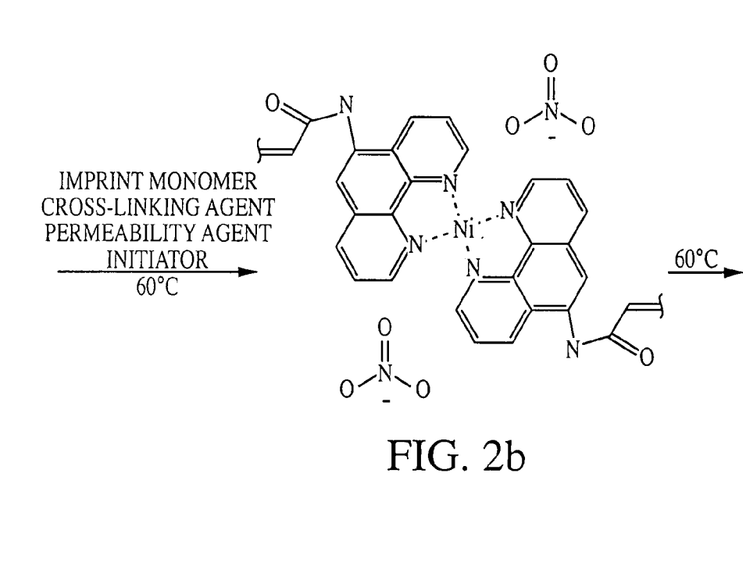
Figure 3A:
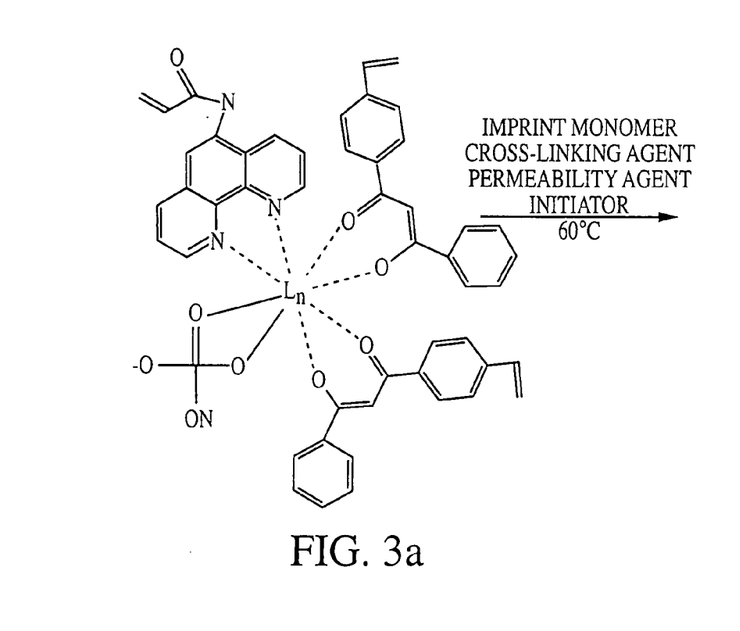
FIGS. 3a-d schematically represent the process of molecularly imprinting a polymer using a lanthanide-phosphate complex according to an aspect of the invention.
Figure 3B:
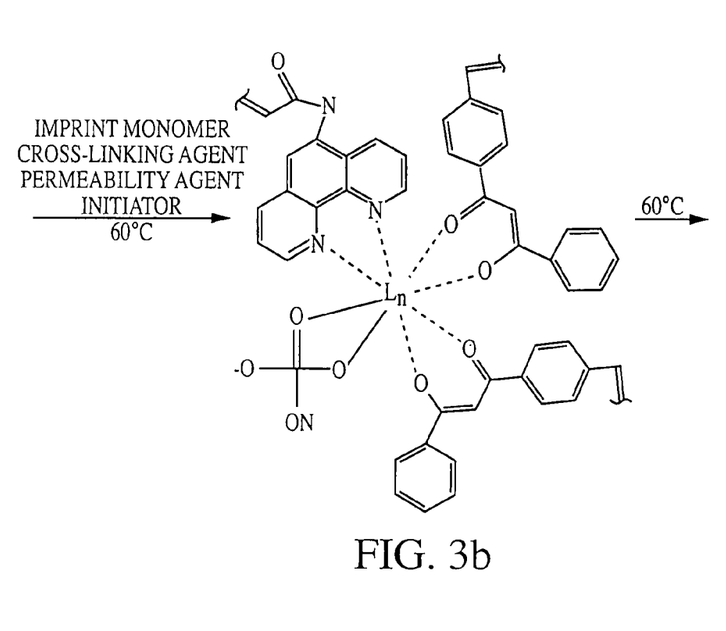

Suitable bidentate ligands for use in the present invention include, but are not limited to vinylbenzoate, vinylbenzoylacetone, acrylamidophenanthroline, phosphate, and nitrate ligands. Ligands are selected based on their thermodynamic affinity for a specific metal ion versus an affinity for competing metal ions. In the case of a lanthanide, neutral adducting ligands include 1,10-phenanthroline and 2-hydroxy-1,2-di-4-vinylphenylethanone (a benzoin oxime vinyl derivative). In the case of a nickel complex, 1,10-phenanthroline is also employed. Other ligands may be suitable for use in the present invention. As can be seen in FIG. 3a, the lanthanide complex includes 1,10-phenanthroline and 2-hydroxy-1,2-di-4-vinylphenylethanone ligands, in addition to a phosphate ligand. These neutral adducting ligands are coordinated to the metal ion by coordinate covalent bonds to provide a site for attachment of the phosphate anion. Likewise, the phenanthroline ligands coordinated to the nickel group in FIG. 2a are required as adducting ligands so that the nitrate will bind with the compound.

Figure 7:
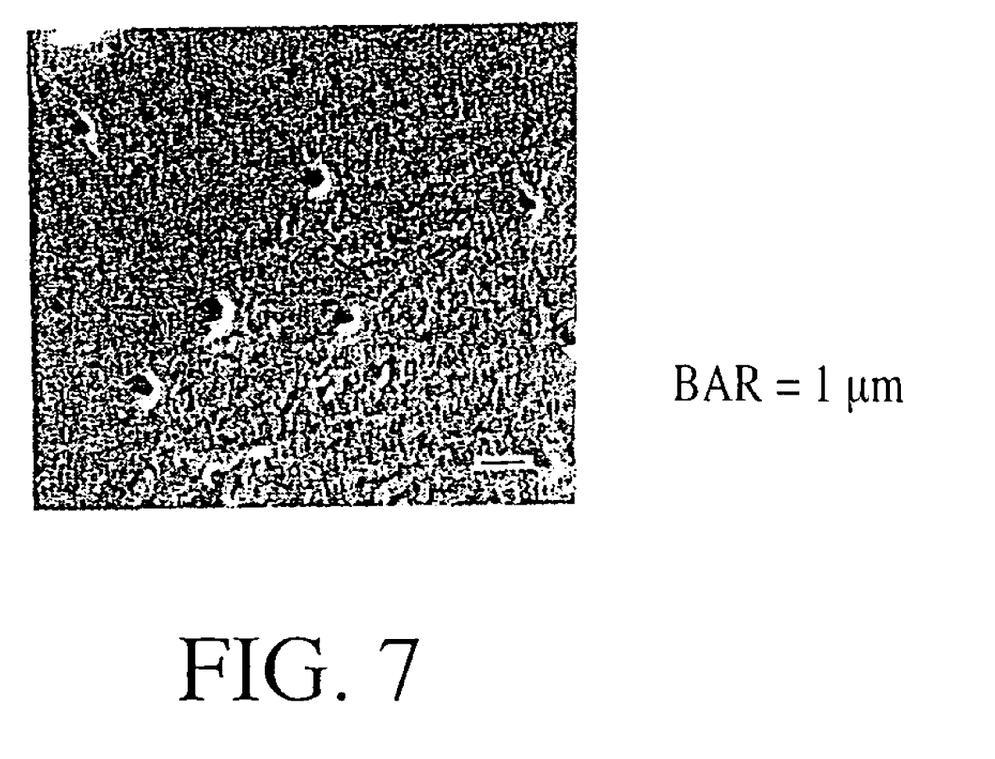
FIG. 7 is a scanning electron micrograph illustrating the spacing between channels according to an aspect of the invention.

The polyester permeability agents are preferably prepared from diglycolic acid and 1,6-hexanediol, and are preferably added to the polymerization mixture to increase swelling in the membrane in aqueous solutions. The length of the alkyl chain in the diol component used in forming the polyester also provides organizational spacing of between the channels or association sites formed in the polymer membrane as illustrated in FIG. 7. Thus, the addition of polyester organizes the molecularly imprinted membrane into a relatively regular array of binding sites.

Another goal in preparing a molecularly imprinted membrane is to have high transport flux, so that ions may readily pass through the membrane and be captured by the selective binding site or cavity. The mobility of any ion in solution is a function of mass and size. Polymeric membranes have the physical and chemical stability for practical applications, but are often hampered by low transport flux. The addition of polyester to the polymerization mixture improves flux.

Figure 4:
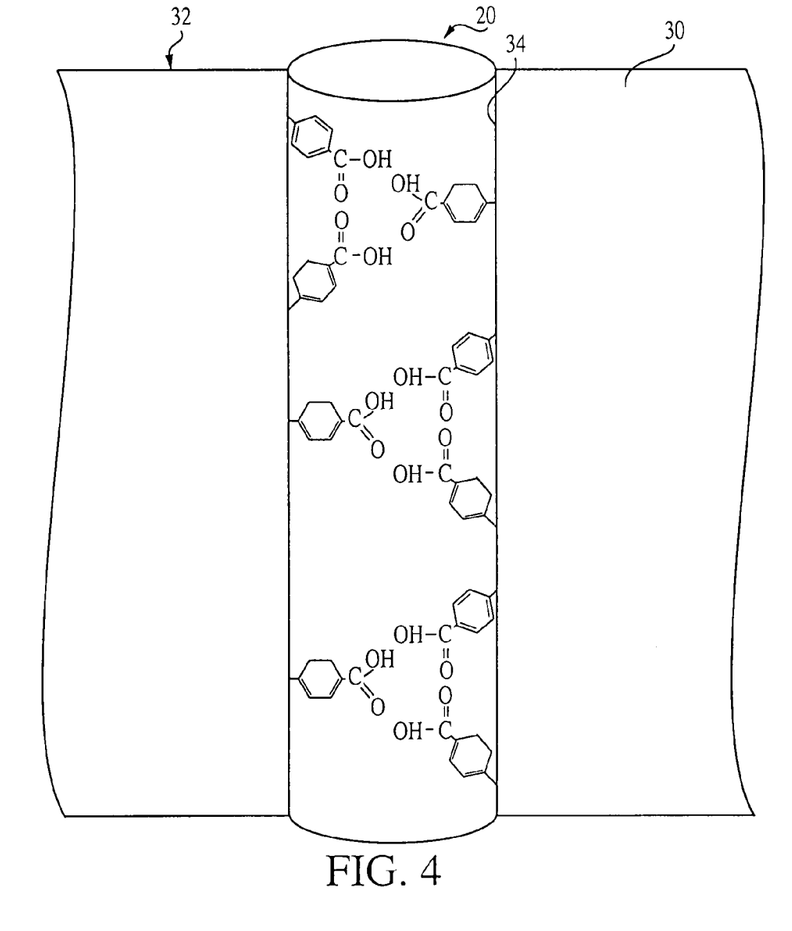
FIG. 4 is a cross-section of the membrane illustrated in FIG. 1d, taken along lines A-A, and illustrates a channel formed by the removal of the permeability agent and the arrangement of the selective binding sites for ferric cations by the removal of the ferric cations by acid treatment.
Figure 5:
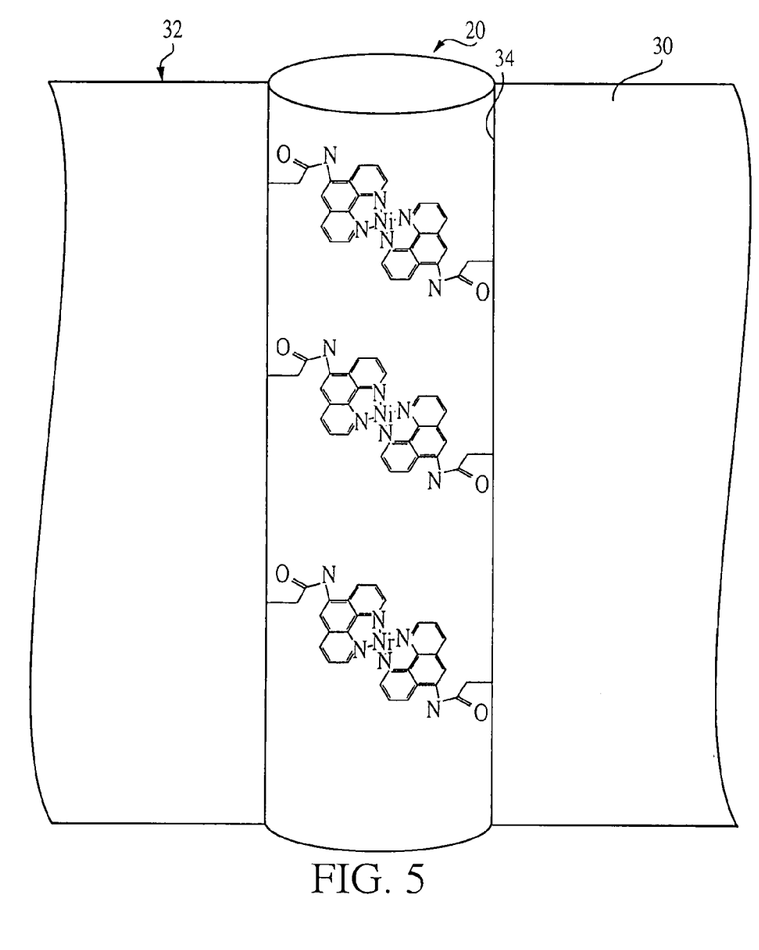
FIG. 5 is a cross-section of the membrane illustrated in FIG. 2d, taken along lines B-B, and illustrates a channel formed by the removal of the permeability agent and the arrangement of the selective binding sites for nitrate ions by the removal of the nitrate anions by acid treatment.
Figure 6:
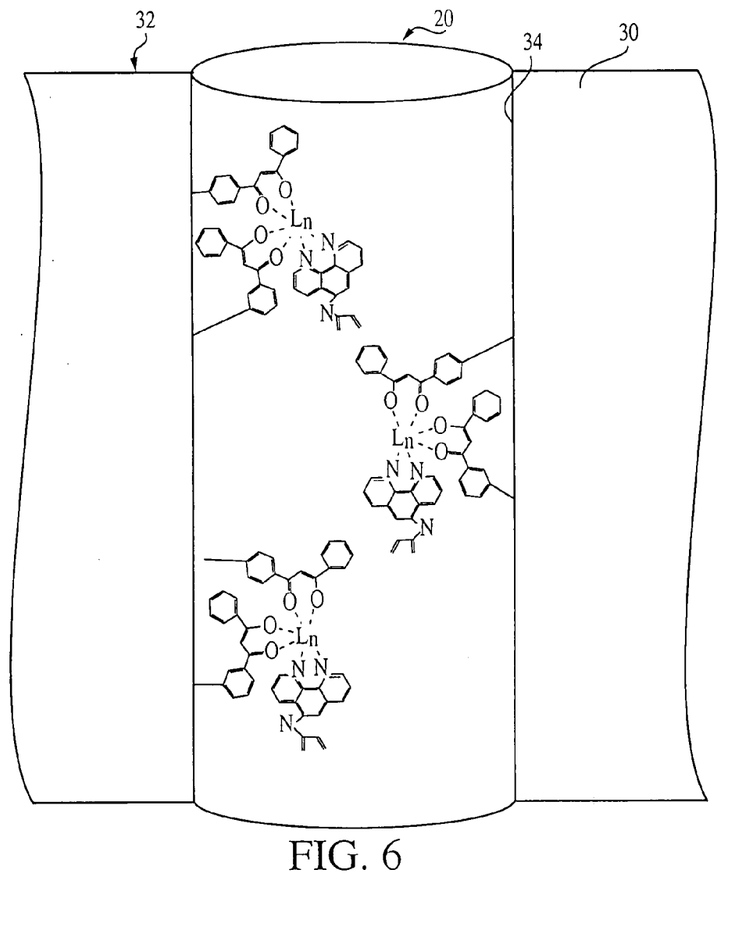
FIG. 6 is a cross section of the membrane illustrated in FIG. 3d, taken along lines C-C, and illustrates a channel formed by the removal of the permeability agent, and the arrangement of the selective binding sites for phosphate anions by the removal of the phosphate anions by acid treatment.

Upon removal of the polyester from the molecularly imprinted membrane with acidic solution, channels are formed in the membrane. Within the channels, a majority of binding sites is congregated as illustrated in FIGS. 4, 5, and 6. The channels formed in the polymer membrane through the addition of polyester to the polymerization mixture further increase permeability, and also direct ions to the imprinted binding sites. The addition of polyester thus increases flux, while maintaining selectivity for the target ion and not for competing ions, as the polyester associates with the metal ions of the ion imprinting complex.

The acid treatment should remove the target ion, but not adversely affect the imprinted cavity. The acidic treatment for removing the polyester, and target phosphate and ferric ions has a concentration of preferably 0.1 M acetic acid followed by a 5% nitric acid solution. In the case of removing the nitrate ion from the nickel-nitrate complex, a less aggressive treatment is required, due to the presence of phenanthroline on the nickel-nitrate complex, as illustrated in FIG. 2a. Because nitrate is negatively charged, without the presence of phenanthroline, it would not bond with nickel. Phenanthroline is a neutral coordinating ligand that retains the nickel atom, and provides a site to which the analyte anions will bind.

It is to be understood that a solution containing target anions or cations passing through the membrane in one direction requires a counter flow of oppositely charged ions in the reverse direction to maintain electroneutrality. Thus, a surplus of cations should be maintained in the receiving solution when removing ferric ions using the dialysis membrane. Likewise, a surplus of anions should be maintained in the receiving solution when removing phosphate and nitrate anions. For example, chloride may be added to replace either nitrate or phosphate. Calcium may be added to replace iron in a biological setting. In other settings, protons may be used in replacing iron.

Although the MIP has been described as capturing ions from solution, according to another aspect of the invention, the captured ions may be collected, and reused in another application. For example, the nitrate ions may be collected and reused by a farmer in providing nutrients to the soil, or by industry in a variety of uses.

Any suitable monomer that provides an accurate imprint of the ion imprinting complex on polymerization may be used for the synthesizing a MIP in accordance with the principles of the present invention. A preferred matrix monomer for use in the present invention is styrene. Styrene is preferred since it has low dielectric strength. With polymers such as styrene, when mixed with a polar metal ion and the polyester (which has polar components), the metal ions aggregate at the polar components of the polyester. When the polyester is removed, a tunnel or channel is formed to liberate the metal and create a binding site in the molecularly imprinted polymer.

Other suitable matrix monomers include alkyl methacrylates, including methylmethacrylate, alkylacrylates, allyl or aryl acrylates and methacrylates, cyanoacrylate, methyl styrene, vinyl esters, including vinyl acetate, vinyl chloride, methyl vinyl ketone, vinylidene chloride, acrylamide, methacrylamide, acrylonitrile, methacrylonitrile, 2-methyl-1-heptene; 2-methyl-1-hexene; 2-methyl-1,4-pentadiene; (t)-3-methyl-1-pentene; (±)-4-methyl-1-pentene; (±)-3-methyl-1-pentene-3-ol; 2-methyl-1-pentene; α-methyl styrene; vinyl crotanoate; vinyl cyclohexane; and the like.

Crosslinking agents that lend rigidity and flexibility to the MIP are known to those skilled in the art. The MIP must have sufficient rigidity so that the target ion may be easily removed without affecting the integrity of the polymer. A preferred crosslinking agent for use in the present invention is divinylbenzene.

Other suitable crosslinking agents include di-, tri- and tetrafunctional acrylates or methacrylates, alkylene glycol and polyalkylene glycol diacrylates and methacrylates, including ethylene glycol dimethacrylate (EGDMA) and ethylene glycol diacrylate, vinyl or allyl acrylates or methacrylates, diallyldiglycol dicarbonate, diallyl maleate, diallyl fumarate, diallyl itaconate, vinyl esters such as divinyl oxalate, divinyl malohate, diallyl succinate, triallyl isocyanurate, the dimethacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene)tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3 isocyanatopropylacrylate, 1-methyl-2-isocyanatoethyl methacrylate, 1,1-dimethyl-2 isocyanaotoethyl acrylate, tetraethylene glycol diacrylate, tetraethylene glycol dimethacrylate, triethylene glycol diacrylate, triethylene glycol dimethacrylate, hexanediol dimethacrylate, hexanediol diacrylate, and the like.

Any ratio of matrix monomers to crosslinking monomer agents can be used that provides a polymer structure of appropriate integrity. Those skilled in the art can select suitable ratios of monomers to provide the desired structural integrity. The degree of crosslinking may, however, affect the amount of flux, i.e., a lower degree of crosslinking may provide a higher flux.

The choice of initiator will depend upon the matrix monomers and cross-linking monomer agents that are selected, and does not require undue experimentation by the ordinarily skilled artisan. A preferred initiator for the polymerization mixture is 2,2-azobisisobutyronitrile (AIBN). While free radical polymerization is preferred, monomers can also be selected that are polymerized cationically or anionically. Polymerization conditions should be selected which do not adversely affect the template molecule. Any UV or thermal free radical initiator known to those skilled in the art for free radical polymerization can be used to initiate this method. Examples of UV and thermal initiators include benzoyl peroxide, acetyl peroxide, lauryl peroxide, azobisisobutyronitrile (AIBN), t-butyl peracetate, cumyl peroxide, t-butyl peroxide; t-butyl hydroperoxide, bis(isopropyl)peroxy-dicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, I-hydroxycyclohexyl phenyl ketone, 2,2-dimethyoxy-2-phenylacetophenone, and phenothiazine, and diisopropylxanthogen disulfide.

Figure 1A:
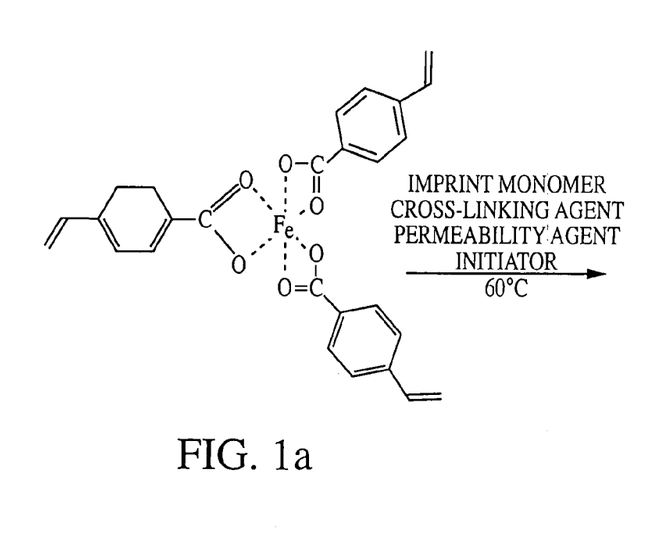
FIGS. 1a-d schematically represent the process of molecularly imprinting a polymer using a ferric vinylbenzoate complex according to an aspect of the invention.
Figure 1B:
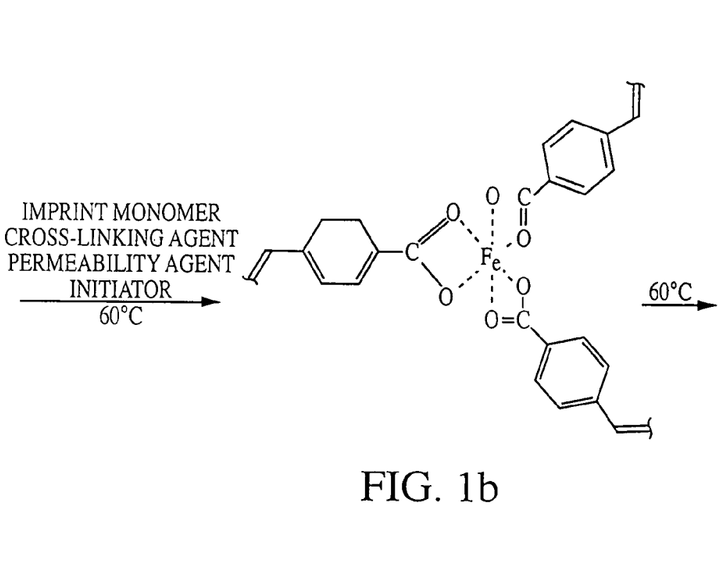
Figure 1C:
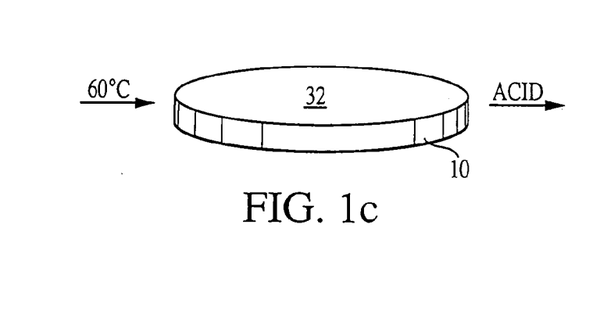
Figure 1D:
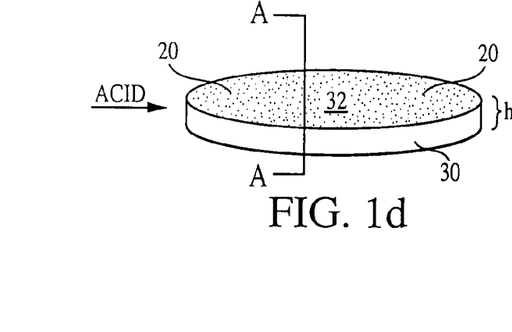
Figure 2C:
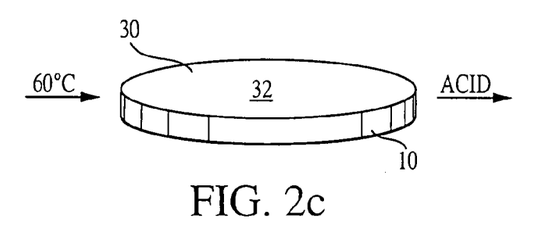
Figure 2D:
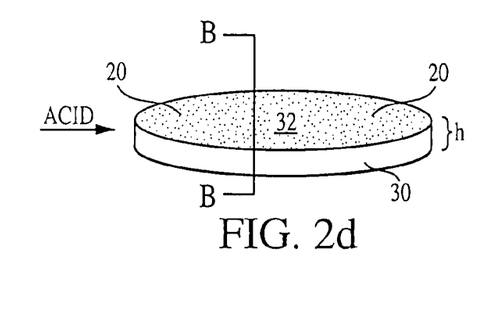
Figure 3C:
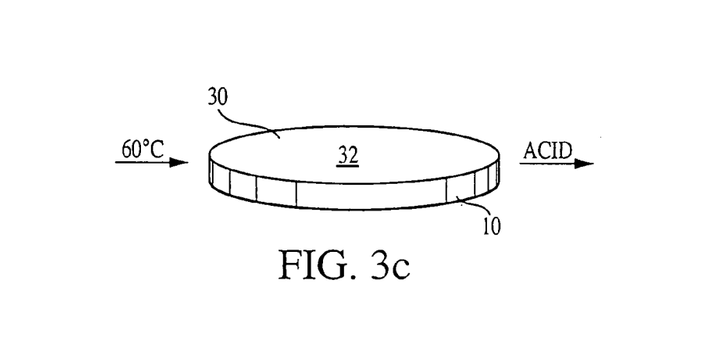
Figure 3D:
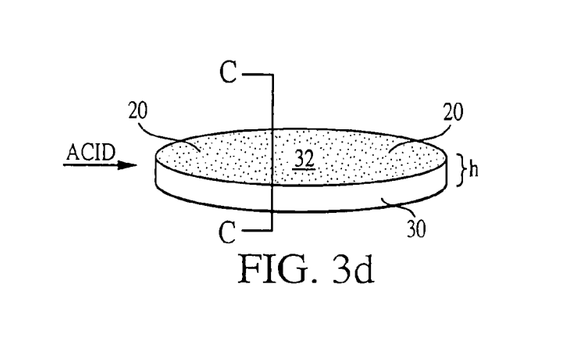

The matrix monomer, crosslinking agent, ion imprinting complex, and permeability agent are combined in a polymerization solution and copolymerized to form a molecularly imprinted polymer. The mixture is preferably sonicated as it polymerizes. When the mixture becomes viscous, the copolymerizing mixture is poured into a mold 10 (illustrated in FIGS. 1c, 2c, and 3c), which may be heated, when polymerization is completed to form a membrane 30. Molds that are heated are subjected to temperatures between about 45 and about 60° C. (depending upon the initiator chosen) for between about 18 hours and about 24 hours. A thickness h of about 100 microns for the membrane is preferred. After the molecularly imprinted membrane is formed, the membrane 30 is washed with an acidic solution until the bulk of the imprint ion is recovered and the polyester permeability agent is removed thereby releasing the metal ion. The number of washes depends upon the concentration of the acidic solution. Removal of the permeability agent creates channels 20 which pass through the membrane. Although only one representative channel 20 is illustrated in cross section in FIGS. 4, 5, and 6, it is to be understood that a plurality of channels are formed throughout the membrane (as illustrated in FIGS. 1d, 2d, and 3d). The cross-linked polymer matrix having channels 20 disposed therethrough with ion binding sites on the interior surface 34 thereof, are in communication with the exterior surface 32 of the membrane by means of the membrane channels 20. Although some ion imprinting complexes may be permanently entrapped and inaccessible within the MIP, a majority of the complexes and selective binding sites are located in the channels, which increases selectivity and activity.

As can be appreciated by the skilled artisan, the preferred synthetic schemes and embodiments described above and in the Examples below are not intended to comprise a comprehensive list of all means by which the MIPs described and claimed herein may be synthesized.

Although the invention has been described with reference to the preferred embodiments thereof, it will be appreciated by those of ordinary skill in the art that modifications can be made to the parts that comprise the invention without departing from the spirit and scope thereof. The following examples will serve to further illustrate the invention but should not be construed as a limitation on the scope thereof, which is defined solely by the appended claims.

EXAMPLES

Unless otherwise indicated in the following examples, the reagent materials were obtained from commercial suppliers and used without further purification, or were prepared in the laboratory.

Example 1

The ion imprinting complexes used in the present invention may be easily synthesized using the following procedures:

A. Iron (III) tris-vinylbenzoate Cation Imprinting Complex Preparation

Ferric iron, Fe(III) was combined with vinylbenzoate ligands to form an iron vinylbenzoate cation imprinting complex. A 3:1 benzoate/iron (III) molar ratio resulted in a neutral complex with all octahedral coordination sites occupied. Synthesis of the iron (III) benzoate complex began with synthesis of vinylbenzoic acid ligand from α-bromo-p-toluic acid according to an established procedure of Broos, R, Tvernier, D., and Anteus, M., J.Chem.Ed., 55(12) (1978), p 819. All reagents used in the synthesis were obtained from Aldrich. The solution was mixed using a magnetic stirrer and stir bar.

The iron (III) vinylbenzoate complex was formed as follows:

Into 50 mL of 50% water/50% methanol 1 gram of Fe(NO3)·9H2O (Fisher Scientific) was dissolved. Vinylbenzoic acid (0.475 g) was dissolved into 50 mL of 50% water/50% methanol. The solution was heated to about 30° C. to facilitate dissolution. The $Fe^{3+}$ solution was added to the vinylbenzoic acid solution, resulting in formation of a yellow precipitate. Excess solvent was allowed to evaporate, leaving about 20 mL. The precipitate was filtered and washed with a few mL of 50% distilled water/50% methanol. Vinyl benzoic acid (VBA) is commercially available, and is also relatively easy to make and use as well. Since it readily polymerizes, it preferably is prepared shortly before it is used. In the present example, VBA was freshly prepared before use.

B. Nickel-Nitrate Anion Imprinting Complex

The metal salts of Nickel (II) were combined with ligating material, bisacrylamidophenanthroline dinitrate, in a 50% methanol/50% water solution to form the complex.

C. Lanthanide-Phosphate Anion Imprinting Complex

The metal salts of Ln (Lanthanide) (III) were combined with ligating material, vinylbenzoylacetonate-acrylamidophenanthroline, in a 50% methanol/50% water solution to form the complex.

Example 2

Preparation of membranes using Ni (II) (bis-acrylamindophenanthroline)dinitrate imprinting complex.

Membrane synthesis was carried out in a screw-top vial by dissolving the Nickel (II) (bis-acrylamindophenanthroline)dinitrate complex (100 mg) in a solution consisting of 400 mL of nitrophenyl octyl ether as a plasticizer. Styrene was added to the solution as a matrix monomer, and divinylbenzene was added as a cross-linking monomer. Polyester (22 mg), prepared from diglycolic acid and 1,6-hexanediol, was added to the polymerization mixture. Because free radical polymerization is inhibited by the presence of oxygen, the mixture is normally purged with nitrogen. After deaeration with dry nitrogen, 20 mg of a free radical initiator, 2,2-azobisisobutyronitrile (AIBN) was added. The vial was sealed and placed in a sonicator at 60° C. Sonication is believed to help maintain homogeneity in the polymer. Zeng, X.; Murray, G. M. Separation Science and Technology, 31:2403-2418 (1996). The polymerization mixture was sonicated until viscous. The viscous solution was poured into a TEFLON mold. The mold was kept in a sealed container and placed in an oven at 60° C. for 18 hours to complete the polymerization. The thickness of the resulting membranes was about 100 microns. The phosphate anions and the polyester were removed by using a 0.1M acetic acid solution followed by a 5% perchloric acid solution. Removal of the polyester is detected by GC-MS of the membrane acid wash solutions.

FIGS. 1a-d, in conjunction with FIG. 4, schematically illustrates the molecularly imprinted polymer membrane prepared in accordance with Example 2.

Example 3

Preparation of membranes using Ln (Lanthanide) (III)tris-(vinylbenzoylacetonate)(acrylamido-phenanthroline)phosphate.

Membrane synthesis was carried out in a screw-top vial by dissolving the Lanthanide (III)(vinylbenzoylacetonate)(acrylamidophenanthroline)biphosphate complex (100 mg) in a solution consisting of 400 mL of nitrophenyl octyl ether as a plasticizer. Styrene was added to the solution as a matrix monomer, and divinylbenzene was added as a cross-linking monomer. Polyester (22 mg), prepared from diglycolic acid and 1,6-hexanediol, was added to the polymerization mixture. After deaeration with dry nitrogen, 20 mg of a free radical initiator, 2,2-azobisisobutyronitrile (AIBN) was added. The vial was sealed and placed in a sonicator at 60° C. The polymerization mixture was sonicated until viscous. The viscous solution was poured into a TEFLON mold. The mold was kept in a sealed container and placed in an oven at 60° C. for 18 hours to complete the polymerization. The thickness of the resulting membranes was about 100 microns. The phosphate anions and the polyester were removed by washing with a 0.1M acetic acid solution followed by a 5% nitric acid solution until the bulk of the imprint ion is recovered and the polyester is removed. The resulting membranes were washed with deionised water until the acid was removed. Removal of the polyester is detected by GC-MS of the membrane acid wash solutions.

FIGS. 2a-d, in conjunction with FIG. 5, schematically illustrate the molecularly imprinted polymer membrane prepared in accordance with Example 3.

Example 4

Preparation of membranes using ferric vinylbenzoate, $Fe(VBA)_3$.

Membrane synthesis was carried out in a screw-top vial by dissolving the iron vinylbenzoate complex (100 mg) in a solution consisting of 400 mL of nitrophenyl octyl ether as a plasticizer. Styrene was added to the solution as a matrix monomer, and divinylbenzene was added as a cross-linking monomer. Polyester (22 mg), prepared from diglycolic acid and 1,6-hexanediol was added to the polymerization mixture. After deaeration with dry nitrogen, 20 mg of a free radical initiator, 2,2-azobisisobutyronitrile (AIBN) was added. The vial was sealed and placed in a sonicator at 60° C. The polymerization mixture was sonicated until viscous. The viscous solution was poured into a TEFLON mold. The mold was kept in a sealed container and placed in an oven at 60° C. for 18 hours to complete the polymerization. The thickness of the resulting membranes was about 100 microns. The iron ions and the polyester were removed by using a 0.1M acetic acid solution followed by a 5% nitric acid solution until the bulk of the imprint ion is recovered, and the polyester is removed. Hydrochloric acid may be used in place of nitric acid. The resulting membranes were washed with deionised water until the acid was removed. Removal of the polyester is detected by GC-MS of the membrane acid wash solutions.

FIGS. 3a-d, in conjunction with FIG. 6, schematically illustrate the molecularly imprinted polymer membrane prepared in accordance with Example 4.

What is claimed is:

1. A molecularly imprinted polymer membrane comprising a cross-linked polymer matrix having channels disposed therethrough, and with selective binding sites for phosphate anions on the interior thereof in communication with the exterior surface of said membrane by means of said channels, which thereby increase permeability and direct said phosphate anions to said binding sites.

2. The membrane according to claim 1, having a thickness of approximately 100 microns.

3. The membrane according to claim 2, wherein said matrix polymer is polystyrene cross-lined with divinylbenzene.

4. A molecularly imprinted polymer membrane comprising a cross-linked polymer matrix having channels disposed therethrough and with selective binding sites for nitrate anions on the interior thereof in communication with the exterior surface of said membrane by means of said channels, which thereby increase permeability and direct said nitrate anions to said binding sites.

5. The membrane according to claim 4, having a thickness of approximately 100 microns.

6. The membrane according to claim 5, wherein said matrix polymer is polystyrene cross-linked with divinylbenzene.

7. A molecularly imprinted polymer membrane comprising a cross-linked polymer matrix having channels disposed therethrough and with selective binding sites for ferric cations on the interior thereof in communication with the exterior surface of said membrane by means of said channels, which thereby increase permeability and direct said ferric cations to said binding sites.

8. The membrane according to claim 7, having a thickness of approximately 100 microns.

9. The membrane according to claim 7, wherein said matrix polymer is polystyrene cross-linked with divinylbenzene.

* * * * *